United States Patent
Renz

[11] 3,746,983
[45] July 17, 1973

[54] APPARATUS FÜR MEASURING VERY HIGH CURRENTS PARTICULARLY DIRECT CURRENTS

[75] Inventor: Robert Renz, Kirchen, Murr, Germany

[73] Assignee: Transformation Union Aktiengesellschaft, Stuttgart-Bad Cannstatt, Germany

[22] Filed: July 20, 1971

[21] Appl. No.: 164,274

[30] Foreign Application Priority Data
July 20, 1970  Germany.................. P 20 35 923.3
July 20, 1970  Germany.................. P 70 27 259.2

[52] U.S. Cl......................... 324/96, 350/96, 350/151
[51] Int. Cl........................... G01r 31/00, G01f 1/22
[58] Field of Search..................... 324/96; 350/96 R, 350/96 WG, 151

[56] References Cited
UNITED STATES PATENTS
3,605,013  9/1971  Yoshikawa et al. .................. 328/96
3,629,703  12/1971  Bernard .............................. 324/96
2,560,430  7/1951  Friend............................ 350/151 X

*Primary Examiner*—Alfred E. Smith
*Attorney*—Spencer & Kaye

[57] ABSTRACT

An apparatus for measuring very high currents, and in particular direct currents, wherein a body of material exhibiting the Faraday effect, e.g., flintglass, is disposed in the magnetic field caused by the current flowing in a conductor. A polarized light beam is passed through this body of material and the displacement of the polarization plane of the light beam is measured as a measure of the current flowing in the conductor. Preferably the body of material exhibiting the Faraday effect forms a closed path around the current conductor which path is followed by the light beam.

9 Claims, 3 Drawing Figures

PATENTED JUL 17 1973      3,746,983

APPARATUS FUR MEASURING VERY HIGH CURRENTS PARTICULARLY DIRECT CURRENTS

BACKGROUND OF THE INVENTION

The present invention relates to a device for measuring very high currents, particularly currents in the order of magnitude of 100 kA and more.

In order to permit measurements by normal measuring instruments of high electric alternating currents flowing through lines or conductors, the current is normally transformed, in practical operation, by means of electromagnetic current converters. These are generally transformers whose primary winding is in series with the line containing the current to be measured and whose secondary winding is connected to the measuring instrument. The number of ampere windings on the primary side are related to the number of ampere windings on the secondary side according to a desired winding ratio so that the high current on the primary side is transformed to a lower current suitable for measuring on the secondary side. With very high currents, single-conductor transformers are preferably employed, i.e., the primary winding consists of only one winding, e.g., in the form of a straight conductor, which is enclosed by a magnetic core on which the appropriate number of secondary windings are disposed.

A similar structure is generally also employed to measure direct currents using, however, the transductor principle in which the saturation bend of the magnetic material employed is utilized and a secondary magnetic counterflux is produced to compensate the magnetic flux produced by the direct current. The current for this secondary magnetic counterflux is taken from an auxiliary alternating current supply and, the measured value of flowing alternating current is directly used as a measure of the magnitude of the direct current.

If the primary currents to be measured reach extraordinarily high levels, i.e., 100 kA and more, the expenditures for the windings to be applied on the secondary side of the transformer or transductor become extraordinarily high. Additionally the heat produced by the current in the secondary windings as well as the influence of field assymetries and foreign fields produce additional difficulties and inaccuracies.

It is known to employ so-called magneto-optic transducers to measure currents at high potentials, resulting in complicated and expensive insulation measures being required for the transducer. Such transducers are used to provide a radiation to bridge the potential difference between high voltage and ground, i.e., a current proportional radiation signal is produced at high voltage which is received by a corresponding receiver at ground potential. One of these known solutions is to apply a body of material exhibiting the Faraday effect, i.e., a material which is light-permeable but which changes the polarization plane of the penetrating light under the influence of a magnetic field, in the magnetic field of the current conductor lying at high potential, to irradiate the body of material with a polarized light beam at ground potential and then to again receive the light beam at ground potential after reflection. The rotation of the polarization plane caused by the body of material now represents a proportional measure for the magnitude of the current in the conductor. These already known magneto-optic transducers are not able to operate correctly at very high currents due to the influence of assymetric and foreign fields

SUMMARY OF THE INVENTION

If the large expenditures for providing correct performance at high assymetric fields and foreign fields and for the production of windings having a large number of turns and for the removal of the heat losses when measuring high currents are considered, a device for measuring such currents becomes economically feasible in which the primary ampere turns need no longer be compensated by secondary ampere turns of the same size. Such a device is achieved according to the present invention, by disposing a body of a material exhibiting the Faraday effect in the magnetic field of the high current carrying conductor, directing a beam of polarized light through the body and then detecting the light beam exiting from the body and measuring the angle of rotation of the polarization plane of the light as a measure of the current in the conductor.

According to a preferred embodiment of the present invention, the optically active material is disposed on a closed path around the primary magnetic flux to be measured, i.e., the body of material surrounds the conductor, and the beam of light caused to follow this closed path so that the enclosed primary ampere turns $\theta = \phi H d\sigma$, and consequently the angle of rotation $\alpha$ of the polarization plane, may be accurately determined since for the rotation of the polarization plane of a light beam passing over this path, the relationship $\alpha = C \cdot \phi H d\sigma = C \cdot \theta$ applies, where $C$ is a material constant (Verdet constant). As a result of this configuration of the light path, stray foreign fields and asymmetries of the arrangement here do not exert any influence.

The actual design of an instrument determining such a path will, for practical reasons, have the shape of a frame, i.e., a hollow body, which surrounds a portion of the conductor. One practical embodiment of such a frame may have a quadratic or four sided shape, due to the rectangular shape of the primary current bar the corners of which are provided with reflecting surfaces inclined at 45°. These inclined surfaces may be suitably ground in and then covered with a mirror coating to cause internal reflection of the light beam.

According to a further feature of the invention, in a deviation from the quadratic form, the frame may also consist of a member or members which are curved in such a manner that total reflection occurs within the frame cross section so that an impinging light beam effects the full cycle around the conductor. A suitable embodiment of this idea is a frame which is made of fiber optical material, i.e., analagous to the known fiber optics which are capable of conducting light along its length even through curvatures.

To augment the rotation effect, according to still a further feature of the invention, the light-conducting frame extends around the current carrying conductor several times so that the current proportional rotation effect for the polarization plane is augmented correspondingly to the number of times the body, and hence the light, passes aro und the conductor.

The light beam passing out of the frame which is modulated with the signal to be measured, is detected by means of a suitable detector for determining the angle of rotation of the polarization plane. This detector may comprise, for example, a polarization filter with a photocell connected thereto. The signal received by the photocell is then amplified in a measuring value amplifier which emits energy required for the measurement.

According to still a further feature of the invention, greater accuracy can be obtained by utilizing a compensation process in the detecting and measuring arrangement in which the light beam emerging or exiting from the body of material is returned to the original polarization plane in a second body of material exhibiting the Faraday effect around which an electrical compensation winding is placed. A suitable indicator determines when the original polarization and the polarization plane after passage of the light become coincident so that the compensation current required to bring about this coincidence then represents a directly proportional signal for the current to be measured.

In order to keep the compensation expenditures low, according to still a further feature of the invention, the light path in the further compensating body of material can be extending by providing it with mirrored end surfaces so that multiple reflections occur.

DESCRIPTION OF THE PREFERRED EMBODIMENTS

Figure 1:
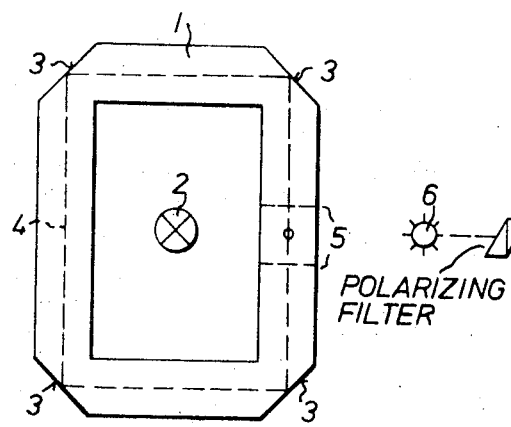
FIG. 1 is a schematic plan view of one embodiment of the invention.
Figure 2:
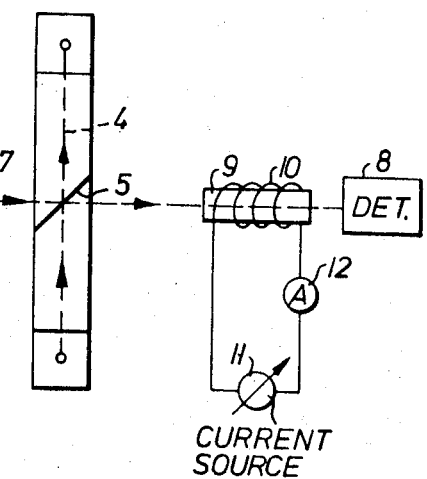
FIG. 2 is a side view of the embodiment of the invention shown in FIG. 1.

Referring now to FIGS. 1 and 2, there is shown a body of material 1 exhibiting the Faraday effect. The body 1 is in the shape of a rectangular or four sided frame which encloses a conductor 2 carrying a high current so that a total circulation integral of $\oint H d\sigma$ is detected. This frame shaped body 1 is provided with ground-in and mirrored reflection surfaces 3 which are inclined by 45° to the outer surfaces of the frame shaped body 1 at its four corners so that a light beam 4 entering the body 1 must travel through the full cycle on the path $S = \oint d\sigma$.

In order to both introduce a light beam into the body 1 and reflect the light beam out of body 1 after it has completely passed therethrough, the frame shaped body is provided with an internal surface 5 which intersects one of the sides of the body 1 at an angle of 45° and is mirrored on both sides thereof. As shown in FIG. 2, the beam of light generated by the source 6 and polarized by filter 7 is directed against one side of surface 5 which causes it to be reflected inside of body 1 for circulation therein. After completing a complete cycle within body 1, the light beam 4 strikes the opposite side of surface 5, e.g. the bottom side, whereby it is reflected out of body 1. The beam of light exiting from body 1 is detected and the angle of rotation of the polarization plane measured by means of a suitable detector 8.

Preferably as indicated above, in order to increase the accuracy of the measurement of the angle of rotation, an arrangement for compensating for the angle of rotation of the polarization plane is provided. As illustrated this arrangement includes a body 9 of material exhibiting the Faraday effect which is placed in the path of the light beam 4 exiting from the body 1. The body 9 is provided with a winding 10 connected in series with a variable current source 11 for providing a magnetic field in the body 9. The current through the winding 10 is varied until the detector 8 indicates that the magnetic field produced by coil 10 is just sufficient to have returned or rotated the polarization plane of the light exiting from body 9 to the original plane of the light introduced into body 1. The current in winding 10, as measured by a meter 12, which is required to return the polarization plane of the light which had been rotated in frame 1, to its original position, is then a directly proportional measuring value of the current in conductor 2.

Figure 3:
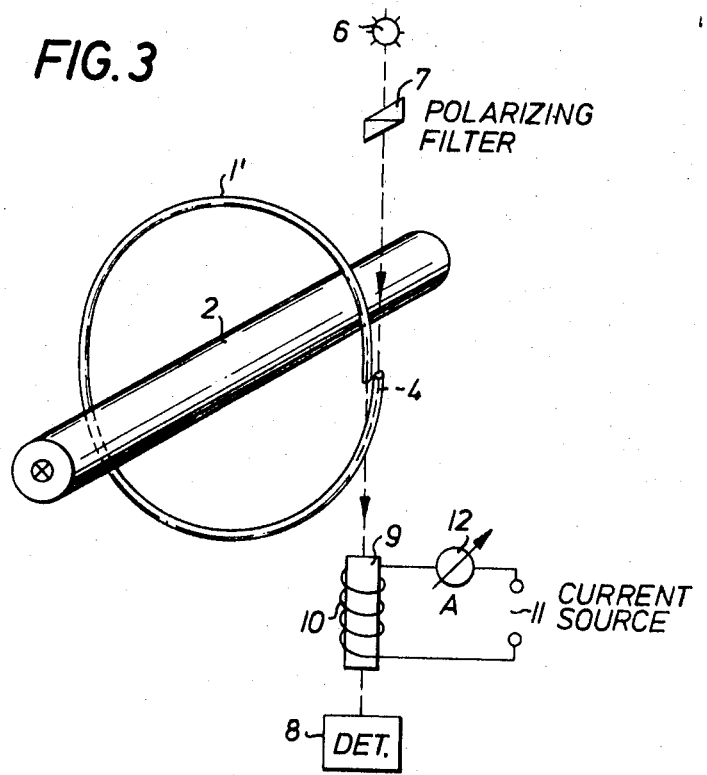
FIG. 3 is a perspective view of the embodiment comprising a frame of a fiber optical material.

Referring to FIG. 3 there is shown a frame consisting of fiber optical material 1' which surrounds the primary conductor 2 instead of the rectangular frame of FIGS. 1 and 2.

In contrast to the known transductor-type direct current instrument transducer principle, in which the direction of the current to be measured can only be determined with additional instruments and under considerable expense, the measuring device according to the present invention additionally directly indicates the direction of the primary current to be measured. Moreover, mixed currents, i.e., alternating currents with high aperiodic components, can also be measured without difficulties.

It will be understood that the above description of the present invention is susceptible to various modifications, changes and adaptations, and the same are intended to be comprehended within the meaning and range of equivalents of the appended claims.

I claim:

1. Apparatus for measuring very high electrical currents, particularly direct currents, passing through a conductor, comprising:

a body of material exhibiting the Faraday effect disposed in the magnetic field produced by the current passing through said conductor, said body enclosing said current conductor along a single closed path $S = \oint d\sigma$;

means for directing a beam of polarized light through said body along said closed path; and means for detecting the beam of polarized light after exiting from said body and for measuring the angle of rotation of the polarization plane as a measure of the current flowing through said conductor.

2. The apparatus defined in claim 1 wherein said body is a closed four sided frame the four corners of which are provided with internal reflection surfaces which are inclined at approximately 45° with respect to the outer surface of the frame.

3. The apparatus defined in claim 2 wherein said reflection surfaces are ground surfaces which are provided with a coating so as to reflect light traveling within said body.

4. The apparatus defined in claim 2 wherein said frame is provided with an intersecting surface which is provided with a mirror coating on both sides thereof, said intersecting surface forming an angle of 45° with the opposite surfaces of said frame, said polarized beam of light being directed against one side of said intersecting surface for reflection within said body, and being reflected by the opposite side of said intersecting surface, after passage through said body, to said detecting means.

5. The apparatus defined in claim 1 wherein said body is composed of parts which are curved in such a manner that total internal reflection occurs.

6. The apparatus defined in claim 5 wherein said body is formed of a fiber optic.

7. The apparatus defined in claim 1 wherein said detecting and measuring means includes:
a further body of material exhibiting the Faraday effect disposed in the path of the polarized light beam;
means for applying a variable magnetic field to said further body to rotate the angle of the polarization plane of the light beam;
means for detecting the angle of rotation of the beam of polarized light exiting from said further body; and
means for varying the magnetic field applied to said further body to compensate for the angle of rotation of the polarization plane caused by the magnetic field in said first body whereby the current required to produce a magnetic field in said further body sufficient to return the polarization plane of the detected light beam to its original polarization plane is directly proportional to the current in said conductor.

8. The apparatus defined in claim 1 wherein said material exhibiting the Faraday effect is flint glass.

9. A method of measuring very high direct currents flowing in a conductor comprising:
arranging a body of material exhibiting the Faraday effect in the magnetic field surrounding the conductor so as to enclose the current conductor in a single closed path $S = \oint d\sigma$;
directing a beam of polarized light through the body of material along a path $S = \oint d\sigma$ around the conductor; and
determining the angle of rotation of the polarization plane of the beam of light caused by the magnetic field after it has passed along the closed path $S = \oint d\sigma$ as a measure of the current flowing through the conductor.

* * * * *